(12) United States Patent
Yamashita et al.

(10) Patent No.: US 11,765,007 B2
(45) Date of Patent: Sep. 19, 2023

(54) SIGNAL SPECIFICATION IDENTIFICATION APPARATUS, CONTROL CIRCUIT, AND PROGRAM STORAGE MEDIUM

(71) Applicant: Mitsubishi Electric Corporation, Tokyo (JP)

(72) Inventors: Yasutaka Yamashita, Tokyo (JP); Shigeru Uchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/150,353

(22) Filed: Jan. 5, 2023

(65) Prior Publication Data

US 2023/0155868 A1    May 18, 2023

Related U.S. Application Data

(63) Continuation of application No. PCT/JP2020/028410, filed on Jul. 22, 2020.

(51) Int. Cl.
*H04L 7/00* (2006.01)
*H03B 27/00* (2006.01)
*H04L 27/233* (2006.01)
*H04L 27/34* (2006.01)
*H04L 27/38* (2006.01)

(52) U.S. Cl.
CPC ........ *H04L 27/2338* (2013.01); *H04L 27/345* (2013.01); *H04L 27/3818* (2013.01)

(58) Field of Classification Search
CPC ............... H04L 27/2338; H04L 27/345; H04L 27/3818

USPC .......................................................... 375/329
See application file for complete search history.

(56) References Cited

U.S. PATENT DOCUMENTS

| | | | |
|---|---|---|---|
| 7,206,284 B2 * | 4/2007 | Bellows | H04L 47/12 370/230.1 |
| 10,396,849 B1 * | 8/2019 | Badawy | H04B 1/71637 |
| 2018/0219712 A1 * | 8/2018 | Terry | H04J 13/0018 |

FOREIGN PATENT DOCUMENTS

| | | | |
|---|---|---|---|
| JP | 2008-211760 A | | 9/2008 |
| JP | 2008211760 A | * | 9/2008 |

\* cited by examiner

*Primary Examiner* — Tanmay K Shah
(74) *Attorney, Agent, or Firm* — Birch, Stewart, Kolasch & Birch, LLP

(57) ABSTRACT

A signal specification identification apparatus includes processing circuitry that estimates the transmission rate of a received signal, performs sampling frequency conversion on the received signal, calculates a probability corresponding to each of a plurality of candidates for a specification of the received signal, selects a candidate using the respective probabilities, and calculates reliability corresponding to a selected candidate, determines whether to output the selected candidate as an identification result or perform the sampling frequency conversion again, based on the reliability, and changes a parameter indicating the ratio of the sampling frequency conversion when it is determined that the sampling frequency conversion is to be performed again. Processing is repeated until the processing circuitry determines that the selected candidate as the identification result is to be output.

11 Claims, 7 Drawing Sheets

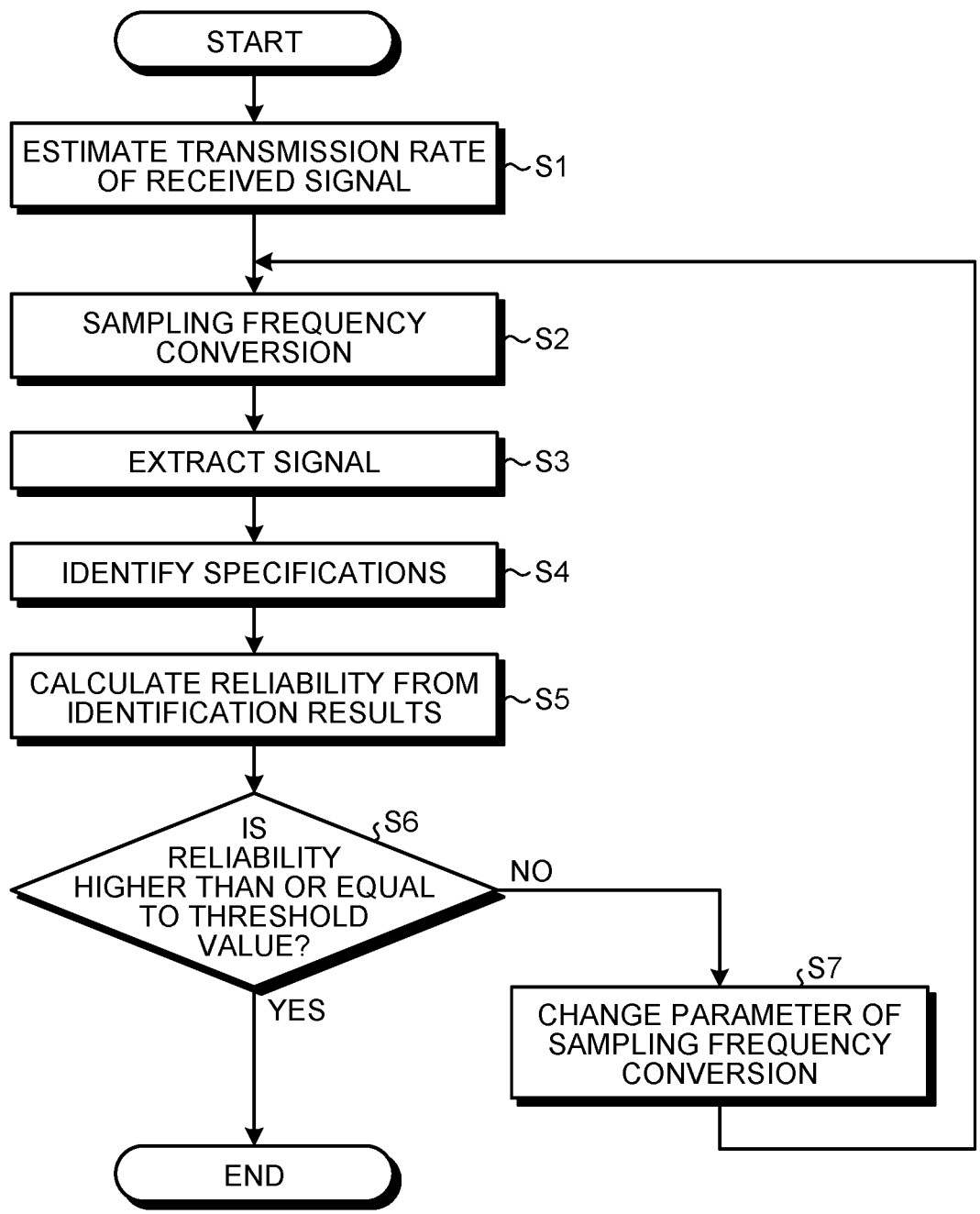

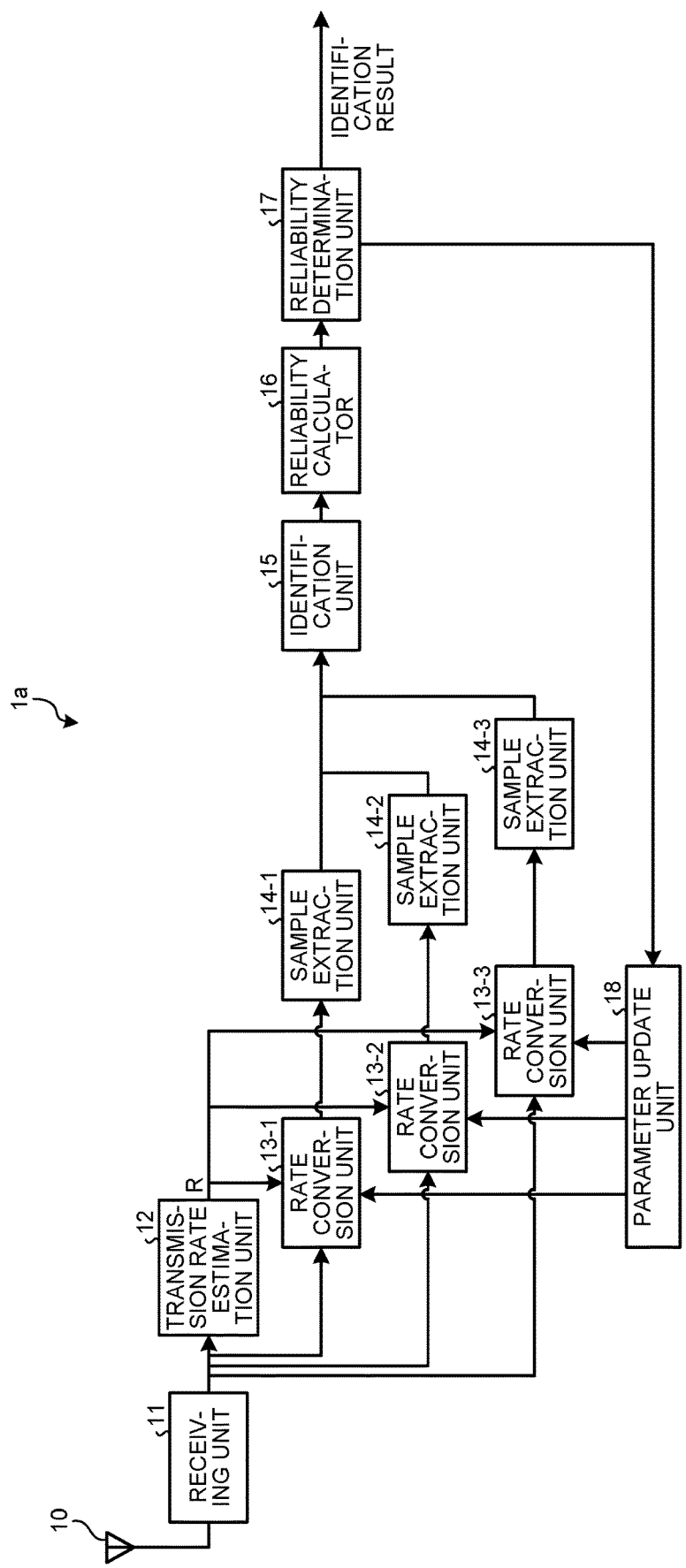

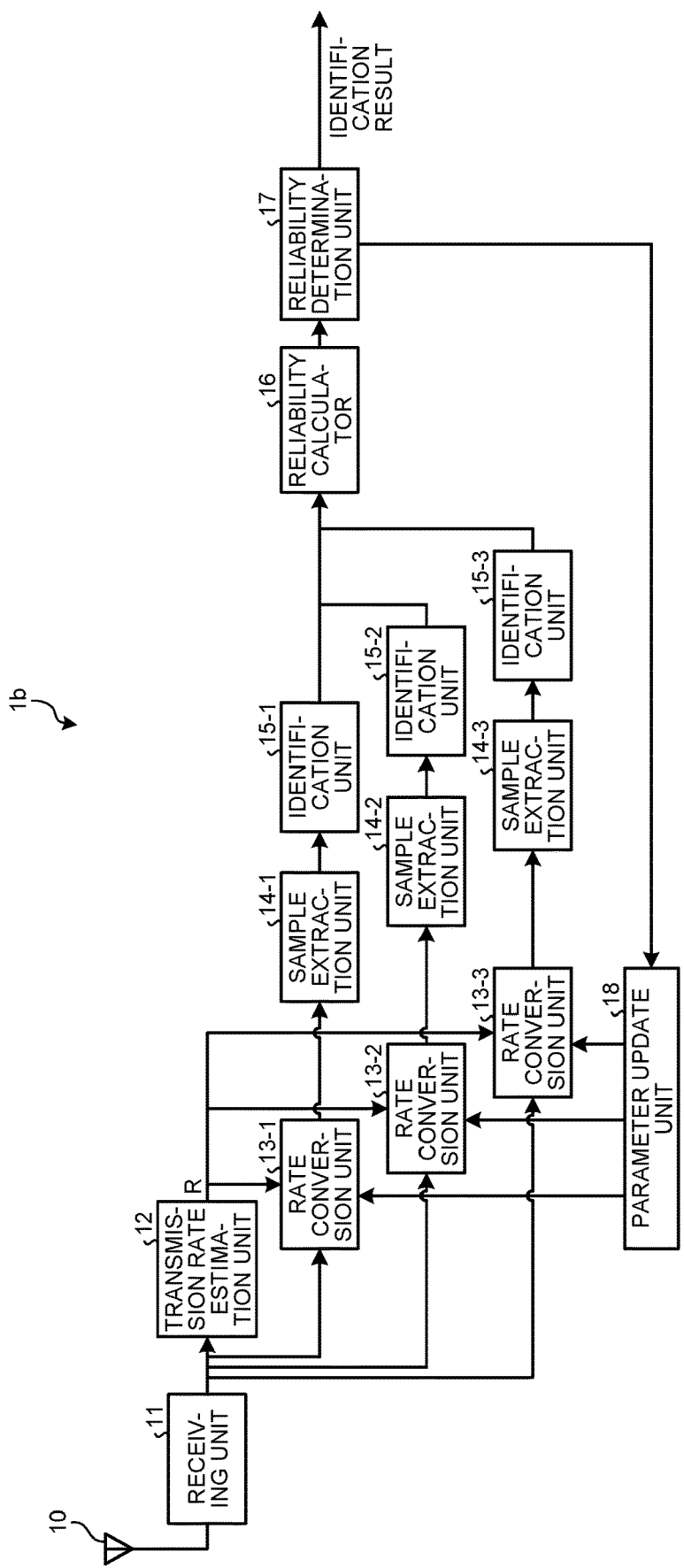

SIGNAL SPECIFICATION IDENTIFICATION APPARATUS, CONTROL CIRCUIT, AND PROGRAM STORAGE MEDIUM

CROSS-REFERENCE TO RELATED APPLICATION

This application is a continuation application of International Application PCT/JP2020/028410, filed on Jul. 22, 2020, and designating the U.S., the entire contents of which are incorporated herein by reference.

BACKGROUND OF THE INVENTION

1. Field of the Invention

The present disclosure relates to a signal specification identification apparatus that estimates a specification of a received signal, a control circuit, and a program storage medium.

2. Description of the Related Art

Background

A signal specification identification apparatus is known which receives a signal whose specification is unknown and estimates a specification of the received signal. For example, Patent Literature 1 discloses an apparatus that successively estimates the carrier frequency of a received signal, corrects the frequency deviation of the received signal based on the estimated carrier frequency, and estimates the modulation scheme based on the estimated carrier frequency and the received signal after the frequency deviation correction.

CITATION LIST

Patent Literature

Patent Literature 1: Japanese Patent Application Laid-open No. 2008-211760

SUMMARY

Technical Problem

In the technique described in Patent Literature 1, a frequency range in which the frequency-domain power spectrum is continuously higher than or equal to a threshold value is set as the transmission bandwidth, the transmission rate is estimated based on the transmission bandwidth, and the amount of phase shift is calculated using the estimated transmission rate to estimate the modulation scheme of the received signal. Specifically, in the technique described in Patent Literature 1, the difference between frequencies at two points where the power spectrum crosses the threshold value is determined as the estimate value of the transmission rate. The threshold value is set at a point of ½ of the maximum power of the power spectrum that has been averaged and smoothed.

A signal whose specification is an estimation target is generally transmitted after being subjected to filtering with a band-limiting filter in a transmitting apparatus. The power spectrum of the signal transmitted from the transmitting apparatus depends on the filtering performed in the band-limiting filter. Therefore, when the band-limiting filter used by the transmitting apparatus is unknown, the threshold value may not be set properly according to the method described in Patent Literature 1 in which the threshold value is determined based on the maximum power of the power spectrum. Thus, there is possibility of resulting in a large error in the estimation of the transmission rate, and consequently, the accuracy of signal specification identification may be degraded.

The present disclosure has been made in view of the above, and an object thereof is to provide a signal specification identification apparatus capable of reducing or preventing the degradation of the accuracy of signal specification identification.

SUMMARY OF THE INVENTION

To solve the above-described problem and achieve the object, a signal specification identification apparatus according to the present disclosure includes processing circuitry that estimates a transmission rate of a received signal, performs sampling frequency conversion on the received signal, and calculates a probability corresponding to each of a plurality of candidates for a specification of the received signal, using a signal after the sampling frequency conversion. The processing circuitry of the signal specification identification apparatus further selects a candidate from among the plurality of candidates using the respective probabilities of the candidates calculated, and calculates reliability corresponding to a selected candidate that is the candidate selected, makes a determination on whether to perform processing to output the selected candidate as an identification result or perform the sampling frequency conversion again, based on the reliability, and changes a parameter indicating the ratio of the sampling frequency conversion and set the changed parameter for the sampling frequency conversion when it is determined that the sampling frequency conversion is to be performed again. In the initial sampling frequency conversion, the sampling frequency conversion is performed such that a sampling frequency after the sampling frequency conversion becomes twice or more the transmission rate estimated, and when the parameter is input, the sampling frequency conversion according to the parameter is performed. The signal specification identification apparatus repeats processing of the parameter changing, the sampling frequency conversion, the calculating the probabilities, the reliability calculation, and the determination until it is determined that the processing to output the selected candidate as the identification result is to be performed.

BRIEF DESCRIPTION OF THE DRAWINGS

FIG. 7 is a flowchart illustrating an example of a signal specification identification procedure in the signal specification identification apparatus of the first embodiment.

FIG. 8 is a diagram illustrating a configuration example of a signal specification identification apparatus according to a second embodiment.

FIG. 9 is a diagram illustrating a configuration example of a signal specification identification apparatus according to a third embodiment.

DETAILED DESCRIPTION OF THE PREFERRED EMBODIMENTS

Description of Embodiments

Hereinafter, a signal specification identification apparatus, a control circuit, and a program storage medium according to embodiments will be described in detail with reference to the drawings.

First Embodiment

Figure 1:
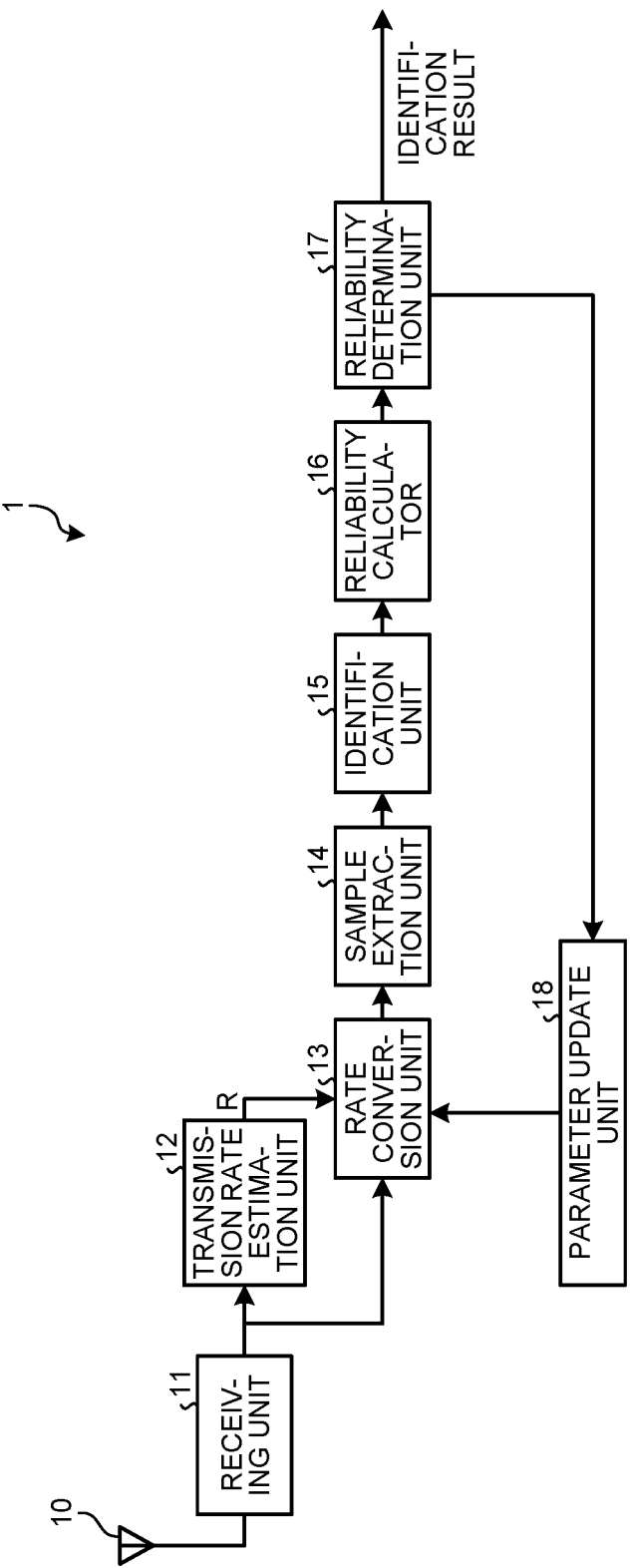
FIG. 1 is a diagram illustrating a configuration example of a signal specification identification apparatus according to a first embodiment.

FIG. 1 is a diagram illustrating a configuration example of a signal specification identification apparatus according to a first embodiment. As illustrated in FIG. 1, a signal specification identification apparatus 1 of the present embodiment includes an antenna 10, a receiving unit 11, a transmission rate estimation unit 12, a rate conversion unit 13, a sample extraction unit 14, an identification unit 15, a reliability calculator 16, a reliability determination unit 17, and a parameter update unit 18.

The antenna 10 receives a signal transmitted from a transmitting apparatus that is a radio apparatus (not illustrated) as a radio wave. The antenna 10 outputs the received signal to the receiving unit 11. The receiving unit 11 performs processing such as band limitation, down-conversion, and analog-to-digital (A/D) conversion on the received signal that is an analog signal output from the antenna 10, and performs semi-synchronous detection processing on the processed digital signal, to output a received signal X(n) that is a combination of an in-phase signal and a quadrature signal, that is, an IQ signal. n corresponds to a number indicating each sampled point in the A/D conversion, and is a value indicating a discretized time.

The transmission rate estimation unit 12 estimates and outputs the transmission rate R of the received signal X(n) output from the receiving unit 11. A method of estimating the transmission rate can be exemplified by, for example, a method of converting the received signal X(n) to a frequency-domain power spectrum and estimating the transmission rate R from the frequency width of the power spectrum. The frequency width is, for example, the full width at half maximum of the power spectrum. For the conversion from the received signal X(n) to the frequency-domain power spectrum, an operation such as a discrete Fourier transform (DFT) or a fast Fourier transform (FFT) can be used.

The rate conversion unit 13 performs sampling frequency conversion on the received signal X(n) output from the receiving unit 11, and outputs a received signal X'(n) after the sampling frequency conversion. An input signal sampling rate Rs0 in the sampling frequency conversion is referred to as a first rate, and a sampling rate Rs after the sampling frequency conversion is referred to as a second rate. The ratio of the second rate to the first rate (second rate/first rate) is hereinafter referred to as a ratio TR. The ratio TR is a rational number. In the initial sampling frequency conversion, the rate conversion unit 13 sets a sampling frequency after the sampling frequency conversion to, for example, a sampling frequency depending on the transmission rate estimated by the transmission rate estimation unit 12, that is, a sampling frequency based on the sampling theorem. For example, the rate conversion unit 13 sets the sampling frequency after the sampling frequency conversion to the minimum value of the sampling frequency based on the sampling theorem, that is, twice the estimated transmission rate. A sampling frequency after the initial sampling frequency conversion is not limited to this, and is only required to be twice or more the estimated transmission rate. In the present embodiment, after reliability on the received signal X'(n) output from the rate conversion unit 13 is calculated, the rate conversion unit 13 receives, from the parameter update unit 18, input of a parameter determined based on the reliability as will be described later. This parameter is a parameter related to the sampling frequency conversion, and is, for example, information indicating the ratio TR. When receiving input of the parameter from the parameter update unit 18, the rate conversion unit 13 performs the sampling frequency conversion on the received signal X(n) output from the receiving unit 11, according to the input parameter, and outputs the received signal X'(n) after the sampling frequency conversion. Details of the rate conversion unit 13 will be described later.

The sample extraction unit 14 extracts an N-sample signal X"(k) (k=0, 1, . . . , N−1) from the received signal X'(n) output from the rate conversion unit 13 and outputs the N-sample signal X"(k). That is, the sample extraction unit 14 is an extraction unit that extracts an N-sample signal having a predetermined signal length from a signal after the sampling frequency conversion. The sample extraction unit 14 extracts a signal with any extraction start position. The sample extraction unit 14 may extract and output a plurality of signals with different extraction start positions. N is a value that determines the amount of data input for the processing of the identification unit 15. Thus, N can be appropriately determined based on an algorithm of the processing of the identification unit 15 to be described later, a required processing time, etc. The sample extraction unit 14 is used when the identification unit 15 requires input with a fixed length, such as when the identification unit 15 is constructed using a neural network. When the identification unit 15 does not require input with a fixed length, the signal specification identification apparatus 1 may not include the sample extraction unit 14. When the signal specification identification apparatus 1 does not include the sample extraction unit 14, a signal output from the rate conversion unit 13 is input to the identification unit 15.

The identification unit 15 identifies a specification of the received signal using the signal X"(k) extracted by the sample extraction unit 14, and outputs the identification results. The identification unit 15 outputs the identification results as a probability distribution. The probability distribution is a distribution expressed by the probability P(x) that the received signal is each specification candidate when each candidate is represented by a variable x. Thus, the identification unit 15 calculates a probability corresponding to each of a plurality of candidates for the specification of the received signal, using a signal after the sampling frequency conversion. Details of the identification unit 15 will be described later. The reliability calculator 16 selects a candidate from among the plurality of candidates using the respective probabilities of the candidates calculated by the identification unit 15, and calculates reliability corresponding to a selected candidate that is the candidate selected.

Specifically, using the probability distribution output from the identification unit 15, the reliability calculator 16 determines a specification with a high probability and reliability corresponding to the specification, and outputs the determined specification and reliability as reliability information. When the reliability included in the reliability information output from the reliability calculator 16 is higher than or equal to a threshold value, the reliability determination unit 17 outputs the specification included in the reliability information as a final identification result. When the reliability included in the reliability information output from the reliability calculator 16 is less than the threshold value, the reliability determination unit 17 outputs the reliability to the parameter update unit 18. Thus, based on the reliability, the reliability determination unit 17 makes a determination on whether to perform processing to output the selected candidate as the identification result or perform the sampling frequency conversion again.

The parameter update unit 18 holds the reliability output from the reliability determination unit 17 and compares the reliability with the previous value to update the parameter of the rate conversion unit 13 so as to increase the reliability. That is, when the reliability determination unit 17 determines that the sampling frequency conversion is to be performed again, the parameter update unit 18 changes the parameter indicating the ratio of the sampling frequency conversion and inputs the changed parameter to the rate conversion unit 13. When the past reliability is not held, that is, in initial processing, the parameter update unit 18 updates the parameter according to, for example, a rule of initial parameter update in accordance with a predetermined optimal solution search algorithm to be described later. For example, in initial processing, the parameter update unit 18 may update the parameter to increase the rate after conversion in the sampling frequency conversion by a certain amount, or may update the parameter to decrease the sampling frequency after conversion in the sampling frequency conversion by a certain amount. Alternatively, in initial processing, the parameter update unit 18 may update the parameter so that the rate after conversion in the sampling frequency conversion becomes a-times the rate before the conversion. The "a" may be defined in any way.

Next, a hardware configuration of the signal specification identification apparatus 1 of the present embodiment will be described. Each of the receiving unit 11, the transmission rate estimation unit 12, the rate conversion unit 13, the sample extraction unit 14, the identification unit 15, the reliability calculator 16, the reliability determination unit 17, and the parameter update unit 18 of the signal specification identification apparatus 1 is implemented by processing circuitry. The processing circuitry may be dedicated hardware or a control circuit including a processor.

Figure 2:
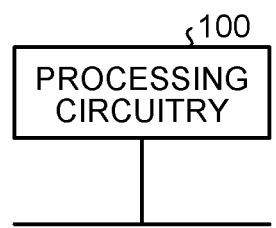
FIG. 2 is a diagram illustrating processing circuitry in the first embodiment when the processing circuitry is dedicated hardware.

FIG. 2 is a diagram illustrating processing circuitry of the present embodiment when the processing circuitry is dedicated hardware. When implemented by dedicated hardware, the receiving unit 11, the transmission rate estimation unit 12, the rate conversion unit 13, the sample extraction unit 14, the identification unit 15, the reliability calculator 16, the reliability determination unit 17, and the parameter update unit 18 of the signal specification identification apparatus 1 are implemented, for example, by processing circuitry 100 illustrated in FIG. 2. The processing circuitry 100 corresponds, for example, to a single circuit, a complex circuit, a programmed processor, a parallel-programmed processor, an application-specific integrated circuit (ASIC), a field-programmable gate array (FPGA), or a combination of them.

Figure 3:
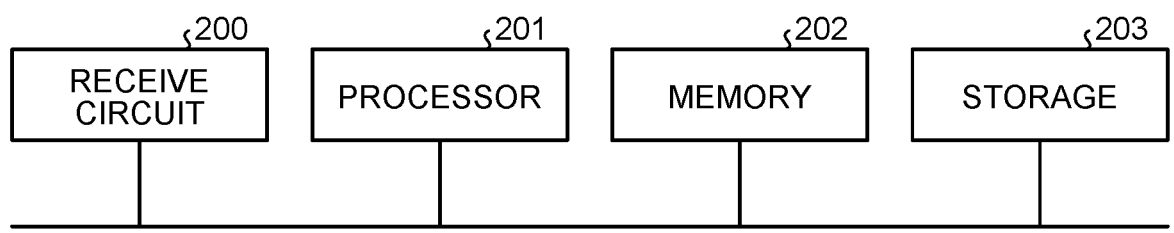
FIG. 3 is a diagram illustrating a configuration example of a control circuit in the first embodiment.

FIG. 3 is a diagram illustrating a configuration example of a control circuit of the present embodiment. The receiving unit 11, the transmission rate estimation unit 12, the rate conversion unit 13, the sample extraction unit 14, the identification unit 15, the reliability calculator 16, the reliability determination unit 17, and the parameter update unit 18 of the signal specification identification apparatus 1 is implemented, for example, by the control circuit illustrated in FIG. 3. As illustrated in FIG. 3, the control circuit includes a receive circuit 200, a processor 201, memory 202, and a storage 203.

The receiving unit 11 is implemented by the receive circuit 200. The processor 201 is, for example, a central processing unit (CPU), a graphics processing unit (GPU), a microprocessor, a microcontroller, a digital signal processor (DSP), or the like. The memory 202 corresponds, for example, to semiconductor memory such as random-access memory (RAM), read-only memory (ROM), flash memory, an erasable programmable read-only memory (EPROM), or an electrically erasable programmable read-only memory (EEPROM) (registered trademark), a magnetic disk, a flexible disk, or the like. The storage 203 corresponds, for example, to semiconductor memory, a magnetic disk, a flexible disk, a digital versatile disc (DVD), or the like.

When the functions of the transmission rate estimation unit 12, the rate conversion unit 13, the sample extraction unit 14, the identification unit 15, the reliability calculator 16, the reliability determination unit 17, and the parameter update unit 18 illustrated in FIG. 1 are implemented by the control circuit illustrated in FIG. 3, the functions are implemented by software, firmware, or a combination of software and firmware. The software or firmware is described as a program and stored in the memory 202. The processor 201 reads and executes the program stored in the memory 202 to implement the function of each unit. That is, the program is a program for controlling the signal specification identification apparatus 1. When information is recorded while the program is executed by the processor 201, data may be held in the memory 202, or data may be held in the storage 203. The program may be provided by a program storage medium that is a storage medium, or may be provided by a communication medium or the like.

Thus, the control circuit illustrated in FIG. 3 is a control circuit for controlling the signal specification identification apparatus, and causes the signal specification identification apparatus to perform a transmission rate estimation step of estimating the transmission rate of a received signal, a sampling frequency conversion step of performing sampling frequency conversion on the received signal, and an identification step of calculating a probability corresponding to each of a plurality of candidates for a specification of the received signal, using a signal after the sampling frequency conversion. Further, the control circuit causes the signal specification identification apparatus to perform a reliability calculation step of selecting a candidate from among the plurality of candidates using the respective probabilities of the candidates calculated by the identification step, and calculating reliability corresponding to a selected candidate that is the candidate selected, and a reliability determination step of making a determination on whether to perform processing to output the selected candidate as an identification result or perform the sampling frequency conversion again, based on the reliability. Furthermore, the control circuit causes the signal specification identification apparatus to perform an update step of changing a parameter indicating the ratio of the sampling frequency conversion when it is determined in the reliability determination step that the sampling frequency conversion is to be performed again. The control circuit controls the signal specification identification apparatus such that in the sampling frequency conversion step, when the parameter is changed by the update step, the sampling frequency conversion is performed according to the changed parameter, and causes the signal specification identification apparatus to repeat the update step, the sampling frequency conversion step, the identification step, the reliability calculation step, and the reliability determination step until it is determined in the reliability determination step that the processing to output the selected candidate as the identification result is to be performed.

Furthermore, the transmission rate estimation unit 12, the rate conversion unit 13, the sample extraction unit 14, the identification unit 15, the reliability calculator 16, the reliability determination unit 17, and the parameter update unit 18 illustrated in FIG. 1 may be implemented by a combination of the processing circuitry 100 that is dedicated hardware and the control circuit illustrated in FIG. 3.

Figure 4:
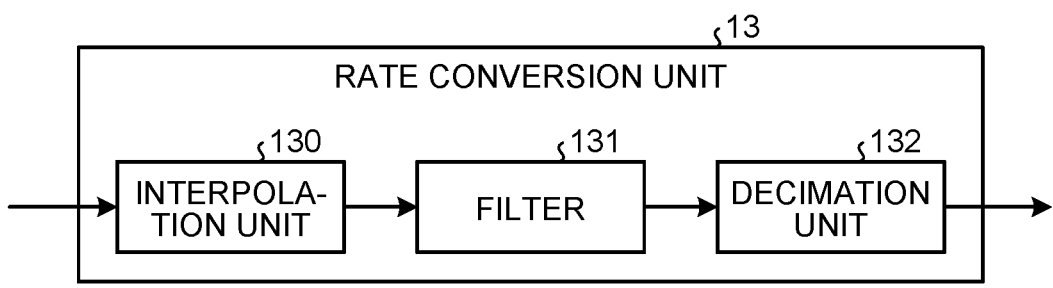
FIG. 4 is a diagram illustrating a configuration example of a rate conversion unit in the first embodiment.

Next, details of the rate conversion unit 13 of the present embodiment will be described. FIG. 4 is a diagram illustrating a configuration example of the rate conversion unit 13 of the present embodiment. The rate conversion unit 13 includes an interpolation unit 130, a filter 131, and a decimation unit 132. The interpolation unit 130 interpolates the received signal X(n) output from the receiving unit 11 and outputs the interpolated signal. A first ratio that is the ratio between the number of data points of the signal before being interpolated in the interpolation unit 130 and the number of data points of the signal after being interpolated can be changed. The filter 131 performs filtering to remove aliasing on the interpolated signal output from the interpolation unit 130, and outputs the filtered signal.

The decimation unit 132 decimates the signal output from the filter 131. A second ratio that is the ratio between the number of data points of the signal before being decimated in the decimation unit 132 and the number of data points of the signal after being decimated can be changed. By adjusting the first ratio and the second ratio, the rate conversion unit 13 can adjust the ratio TR of the rate of the signal output from the rate conversion unit 13 to the rate of the signal input to the rate conversion unit 13. When the rate conversion unit 13 has the configuration illustrated in FIG. 4, the parameter input from the parameter update unit 18 to the rate conversion unit 13 may be the first ratio and the second ratio, or may be the ratio TR. When the parameter input from the parameter update unit 18 is the ratio TR, for example, a control unit (not illustrated) of the rate conversion unit 13 determines the first ratio and the second ratio based on the ratio TR, and sets the determined first ratio and second ratio in the interpolation unit 130 and the decimation unit 132, respectively.

Although FIG. 4 illustrates the example in which the rate conversion unit 13 includes the interpolation unit 130, the filter 131, and the decimation unit 132, the configuration of the rate conversion unit 13 is not limited to this. For example, the rate conversion unit 13 may be implemented by a polyphase filter.

Figure 5:
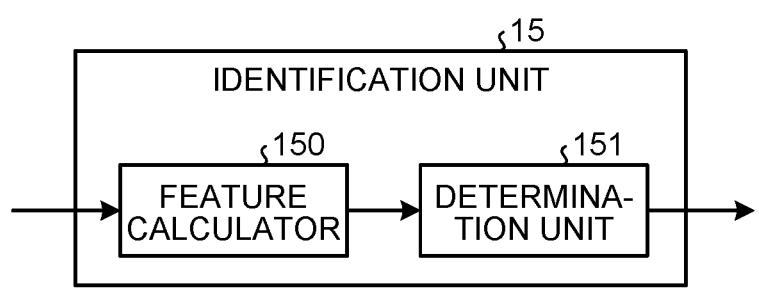
FIG. 5 is a diagram illustrating a configuration example of an identification unit in the first embodiment.

Next, details of the identification unit 15 of the present embodiment will be described. FIG. 5 is a diagram illustrating a configuration example of the identification unit 15 of the present embodiment. The identification unit 15 includes a feature calculator 150 and a determination unit 151. The feature calculator 150 calculates and outputs feature(s) of the signal X"(k) output from the sample extraction unit 14. The feature may be the mean value, variance, or the like of the amplitude of the signal X"(k), or may be the mean value, variance, or the like of the phase of the signal X"(k). Furthermore, two or more of these may be the features. The feature(s) are not limited to these, and may be any information as long as the information can be used to identify the specification of the received signal.

The determination unit 151 identifies the specification of the received signal, using the feature output from the feature calculator 150. For example, the determination unit 151 calculates probabilities corresponding to a plurality of candidates based on the distances between the features output from the feature calculator 150 and predetermined features corresponding to the plurality of candidates. The specification identified by the determination unit 151 includes, for example, at least one of the modulation scheme, the signal-to-noise ratio, and the filter coefficient. For example, a plurality of candidates for the specification are defined in advance, and the determination unit 151 determines a probability for each of the plurality of candidates.

For example, for the modulation scheme, when five modulation schemes of amplitude modulation (AM), frequency modulation (FM), binary phase-shift keying (BPSK), quadrature phase-shift keying (QPSK), and frequency-shift keying (FSK) are set as candidates, the determination unit 151 determines probabilities corresponding to the five candidates, respectively, using the features. For example, for each modulation scheme, in a multidimensional space of at least two of the mean value and the variance of the amplitude of X"(k) and the mean value and the variance of the phase of X"(k), the region of each candidate is determined in advance. Then, for example, the determination unit 151 calculates the distance between the features output from the feature calculator 150 and each candidate, and calculates the probability according to the distance. The distance is, for example, the distance between the center of the region of each candidate, that is, a feature corresponding to each candidate and the feature output from the feature calculator 150. Conversion from distance to probability is performed, for example, by defining in advance the relationship between distance and probability by a table, a formula, or the like such that probability increases as distance decreases. Thus, the determination unit 151 can determine the probability distribution P(x) when each candidate is indicated by the variable x. The variable x is set for each candidate. For example, x=1 for amplitude modulation, and x=2 for frequency modulation. The correspondences between the modulation schemes and the values of the variable are not limited to this, and may be set in any manner.

Furthermore, for example, when thirty signal-to-noise ratios 1, 2, . . . , and 30 are set as candidates for the specification, the determination unit 151 calculates the probability for each candidate. Likewise, when the filter coefficient is identified as the specification, the probability is calculated for each candidate filter coefficient value. The determination unit 151 may define in advance the positions of the features in the multidimensional space and the probabilities such that the sum total of the probabilities of all the candidates becomes one, or may calculate the probability individually for each candidate.

When a plurality of signals is extracted and the plurality of signals is output by the sample extraction unit 14, the identification unit 15 performs the above-described identification on the individual signals and outputs the results of averaging the individual identification results.

A specification identification method in the determination unit 151 is not limited to the above-described example. Any method may be used. For example, a classification algorithm such as a decision tree, random forest, or the k-nearest neighbor algorithm may be used for specification identification in the determination unit 151.

Furthermore, the configuration of the identification unit 15 is not limited to the example of FIG. 5. For example, the identification unit 15 may use machine learning such as a neural network. That is, the identification unit 15 may calculate probabilities corresponding to a plurality of candidates input, respectively, using a learned model that has been learned according to learning data that includes a signal after the sampling frequency conversion and probabilities each corresponding to the plurality of candidates. A neural network will be described as an example of machine learning.

Figure 6:
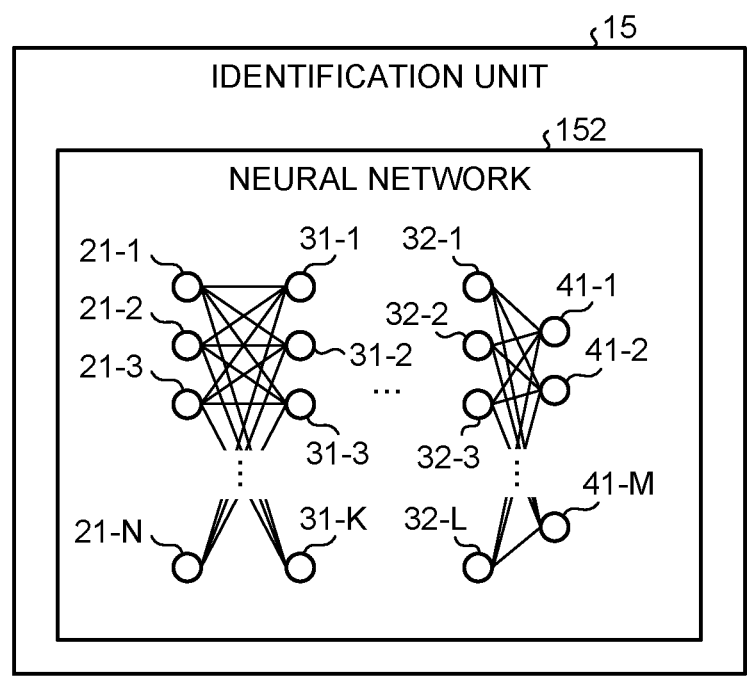
FIG. 6 is a diagram illustrating a configuration example of the identification unit using a neural network.

FIG. 6 is a diagram illustrating a configuration example of the identification unit 15 using a neural network. As illustrated in FIG. 6, a neural network 152 that is an example of a machine learning unit includes nodes 21-1 to 21-N in an input layer, nodes 31-1 to 31-K and 32-1 to 32-L in an intermediate layer, and nodes 41-1 to 41-M in an output layer.

As described above, N is the number of samples of the signal X"(k). The samples of the signal X" (k) are input to the nodes 21-1 to 21-N in the input layer. For example, X"(0) is input to the node 21-1, X"(1) is input to the node 21-2, . . . . FIG. 6 illustrates an example in which the intermediate layer consists of a plurality of layers, but the number of the intermediate layer may be one. K and L are the numbers of nodes in the respective layers of the intermediate layer. M is the number of candidates for the specification to be identified.

The neural network 152 generates a learned model by performing learning using, as learning data, a data set including the N-sample signal X"(k) and M probabilities corresponding to the candidates that are correct data obtained in advance. For example, as described above, five types of modulation schemes of amplitude modulation, frequency modulation, binary phase-shift modulation, quadrature phase-shift modulation, and frequency-shift modulation are set as candidates. At this time, an amplitude-modulated signal is transmitted and received by the signal specification identification apparatus 1. At this time, correct data in which the probability of amplitude modulation is "1" and the probabilities of the other modulation schemes are zero is input to the neural network 152 together with the N-sample signal X"(k) as learning data. Likewise, for the other modulation scheme candidates, data sets including correct data and the N-sample signal X"(k) are generated and input to the neural network 152. The N-sample signal X"(k) in the learning data may be generated using a signal actually received by the signal specification identification apparatus 1 or may be generated in simulation.

In the neural network 152, each layer performs corresponding weighting and outputs the results to the nodes in the next layer. When the learning data as described above is input, weights corresponding to the nodes are calculated such that output from the neural network 152 when the N-sample signal X"(k) is input to the neural network 152 approaches the correct data. Consequently, a learned model is generated.

When the learned model is generated, that is, when the weights of the nodes are determined by the above learning, the neural network 152 can infer the probabilities corresponding to the candidates when receiving input of the N-sample signal X"(k). Although the example in which the identification unit 15 performs both the generation of a learned model and inference has been described here, a learned model may be generated in advance and the learned model may be used for the identification unit 15. In this case, the neural network 152 is a learned model after weights are determined.

The neural network used in the identification unit 15 may be a multilayer perceptron, a deep neural network, a convolutional neural network, a recurrent neural network, or the like, or may be a combination of them.

Next, the operation of the present embodiment will be described with reference to a flowchart. FIG. 7 is a flowchart illustrating an example of a signal specification identification procedure in the signal specification identification apparatus 1 of the present embodiment. The signal specification identification apparatus 1 estimates the transmission rate of a received signal (step S1). Specifically, a signal received by the antenna 10 is processed by the receiving unit 11 and input to the transmission rate estimation unit 12 as an IQ signal. Then, the transmission rate estimation unit 12 estimates the transmission rate of the input IQ signal, that is, the received signal.

Next, the rate conversion unit 13 performs sampling frequency conversion on the received signal (step S2). Next, the sample extraction unit 14 extracts a signal (step S3). Specifically, the sample extraction unit 14 extracts an N-sample signal from the received signal after the sampling frequency conversion.

Next, the identification unit 15 identifies a specification of the received signal, using the signal extracted by the sample extraction unit 14 (step S4). As described above, the identification results obtained by the identification are a probability distribution indicating the respective probabilities of specification candidates. Next, the reliability calculator 16 calculates reliability from the identification results (step S5). Specifically, the reliability calculator 16 calculates reliability from the probability distribution output from the identification unit 15, and determines a specification with a high probability and the corresponding reliability. That is, the reliability calculator 16 selects a candidate with the highest probability out of the respective probabilities of the candidates, as a selected candidate. For example, the reliability calculator 16 determines a maximum value Pmax of the value of the probability P(x) of the specification corresponding to the variable x, and xmax that is the value of x corresponding to Pmax, and outputs xmax and Pmax as the specification with a high probability and its reliability, respectively. When the sum total of the M probabilities corresponding to the M candidates, that is, P(x) (x=0, 1, . . . , M−1) does not become "1", the reliability calculator 16 may calculate the reliability that is obtained by dividing Pmax by the sum of P(x) (x≠xmax). Alternatively, the reliability calculator 16 may calculate, as the reliability, a statistical value such as kurtosis obtained from the probability distribution. Furthermore, as the reliability, an index may be used whose value is high when P'(x) that is a preset probability distribution is similar to P(x) that is the output of the identification unit 15, and is low when they are not similar to each other. Using such an index provides the effect of reducing false positives of the identification results. As a specific example, the degree of similarity is calculated according to an index such as the Kullback-Leibler divergence, using P(x) that is the output of the identification unit 15 and preset P'(x), and the probability weighted by the degree of similarity can be used as the reliability.

Next, the reliability determination unit 17 determines whether or not the reliability output from the reliability calculator 16 is higher than or equal to a threshold value (step S6). When the reliability is higher than or equal to the threshold value (Yes in step S6), the reliability determination unit 17 outputs the specification output from the reliability calculator 16 as a final identification result and completes the processing.

When the reliability included in the reliability information output from the reliability calculator 16 is less than the threshold value (No in step S6), the reliability determination unit 17 inputs the reliability to the parameter update unit 18, the parameter update unit 18 changes a parameter of the sampling frequency conversion (step S7), and the processing from step S2 is repeated.

Specifically, in step S7, the parameter update unit 18 holds the previously set parameter and the corresponding reliability, and changes the parameter so as to increase the reliability, using the currently set parameter, the reliability received from the reliability determination unit 17 this time, the previously set parameter, and the previous reliability. The more proper the sampling frequency conversion in the rate conversion unit 13, the higher the identification accuracy of the identification unit 15. The higher the identification accuracy of the identification unit 15, the closer to "1" the probability P(y) corresponding to true a specification y, and the closer to zero the probabilities corresponding to specifications other than y, that is, P(x) (x≠y). Therefore, by searching for a parameter of the sampling frequency conversion with which P(x) corresponding to a certain candidate value x approaches "1" and P(x) approaches "0", the transmission rate estimation accuracy can be increased, and thus the specification identification accuracy can be increased. For the search, local search or a global optimal solution search algorithm such as simulated annealing may be used. Local search and simulated annealing are examples of a predetermined search algorithm for searching for a solution that maximizes reliability. The search algorithm is not limited thereto. Thus, the parameter update unit 18 holds the past reliability and changes the parameter to increase the reliability according to the predetermined search algorithm for searching for a solution that maximizes the reliability, using the past reliability and the reliability calculated this time. When the reliability is input, the parameter update unit 18 changes the parameter according to a predetermined search method. The parameter update unit 18 inputs the changed parameter to the rate conversion unit 13. The rate conversion unit 13 changes settings using the input parameter.

Thus, when the signal specification identification apparatus is implemented by the control circuit illustrated in FIG. 3, the control circuit is a control circuit for controlling the signal specification identification apparatus 1, and causes the signal specification identification apparatus 1 to perform a transmission rate estimation step of estimating the transmission rate of a received signal, and a sampling frequency conversion step of performing sampling frequency conversion on the received signal. Further, the control circuit causes the signal specification identification apparatus to perform an identification step of calculating a probability corresponding to each of a plurality of candidates for a specification of the received signal, using a signal after the sampling frequency conversion, a reliability calculation step of selecting a candidate from among the plurality of candidates using the respective probabilities of the candidates calculated by the identification step, and calculating reliability corresponding to a selected candidate that is the candidate selected, and a reliability determination step of making a determination on whether to perform processing to output the selected candidate as an identification result or perform the sampling frequency conversion again, based on the reliability. Furthermore, the control circuit causes the signal specification identification apparatus 1 to perform an update step of changing a parameter indicating the ratio of the sampling frequency conversion when it is determined in the reliability determination step that the sampling frequency conversion is to be performed again. In the sampling frequency conversion step, the control circuit controls the signal specification identification apparatus such that when the parameter is changed by the update step, the sampling frequency conversion is performed according to the changed parameter. The control circuit causes the signal specification identification apparatus 1 to repeat the update step, the sampling frequency conversion step, the identification step, the reliability calculation step, and the reliability determination step until it is determined in the reliability determination step that the processing to output the selected candidate as the identification result is to be performed.

Here, the parameter update unit 18 changes the parameter according to the predetermined search algorithm, using the previously set parameter and the corresponding reliability and the currently set parameter and the current reliability. However, depending on an optimal solution search algorithm, the parameter update unit 18 may hold a plurality of past reliabilities and parameters and change the parameter additionally using these reliabilities and parameters. Furthermore, a method of searching for a parameter for a high reliability is not limited to the above-described examples. For example, a method may be used in which a search range around the estimated transmission rate R is searched at predetermined intervals, the highest reliability is selected from among a plurality of reliabilities obtained, and when the selected reliability is less than a threshold value, the search range is changed or the intervals are changed, and the search is performed again.

As illustrated in FIG. 7, the signal specification identification apparatus repeats the processing of the parameter update unit 18, the rate conversion unit 13, the identification unit 15, the reliability calculator 16, and the reliability determination unit 17 until the reliability determination unit 17 determines that processing to output the selected candidate as the identification result is to be performed. Note that the flowchart illustrated in FIG. 7 is an example, and a detailed procedure is not limited to the example illustrated in FIG. 7. In a procedure that can obtain the same result, execution order of steps may be changed or parallelized, for example.

Through the above processing, the signal specification identification apparatus 1 of the present embodiment estimates the transmission rate of a received signal, converts the received signal to the estimated transmission rate to identify a specification, changes a parameter for sampling frequency conversion when the reliability of the identification result is less than a threshold value, and repeats the processing until the reliability becomes higher than or equal to the threshold value. When the reliability becomes higher than or equal to the threshold value, the parameter set in the rate conversion unit 13 corresponds to an accurate estimate value of the transmission rate. Thus, in the present embodiment, the transmission rate is estimated by feedback processing so that the reliability of the identification result becomes higher than or equal to the threshold value. Consequently, the influence of a transmission rate estimation error can be limited. Furthermore, by limiting the influence of a transmission rate estimation error, the accuracy of the estimation of received signal specification can be improved. When a received frequency band extends over a wide band, the frequency resolution of the power spectrum may be lowered if the number of data points in an FFT is the same. In this case, according to the method described in Patent Literature 1, there is possibility in that a transmission rate estimation error becomes large. If an error included in an estimate value of the transmission rate increases, the accuracy of signal specification identification may be degraded because the estimate value of the transmission rate is used to calculate a feature. On the other hand, in the present embodiment, sampling frequency conversion is performed such that the reliability of an identification result becomes higher than or equal to a threshold value by feedback processing. Accordingly, the influence of a transmission rate estimation error can be limited and reduce or prevent the degradation of the accuracy of signal specification identification.

Second Embodiment

FIG. 8 is a diagram illustrating a configuration example of a signal specification identification apparatus according to a second embodiment. As illustrated in FIG. 8, a signal specification identification apparatus 1a of the present embodiment includes the antenna 10, the receiving unit 11, the transmission rate estimation unit 12, rate conversion units 13-1 to 13-3, sample extraction units 14-1 to 14-3, the identification unit 15, the reliability calculator 16, the reliability determination unit 17, and the parameter update unit 18. The configuration of each of the rate conversion units 13-1 to 13-3 is the same as that of the rate conversion unit 13 of the first embodiment. The configuration of each of the sample extraction units 14-1 to 14-3 is the same as that of the sample extraction unit 14 of the first embodiment. The same reference numerals as those in the first embodiment are assigned to components having the same functions as those of the first embodiment without duplicated explanations. Hereinafter, differences from the first embodiment will be mainly described.

The first embodiment includes the single rate conversion unit 13 and the single sample extraction unit 14 and thus can reduce the circuit scale. When high-speed processing is required, a parallelized configuration can be used as illustrated in FIG. 8. In the present embodiment, sampling frequency conversions using different parameters can be performed in parallel, and corresponding sample extractions can be performed in parallel. Therefore, the time from the input of a received signal to the output of an identification result can be shortened as compared with that in the first embodiment.

In the example illustrated in FIG. 8, the signal specification identification apparatus 1a includes the three rate conversion units 13-1 to 13-3 and the three sample extraction units 14-1 to 14-3 to perform processing in three parallels, but the number of parallels is not limited to three and may be two or four or more. That is, the rate conversion units 13-1 to 13-3 are an example of a plurality of rate conversion units, and the number of rate conversion units can be two or more. Likewise, the sample extraction units 14-1 to 14-3 are an example of a plurality of sample extraction units, and the number of sample extraction units can be two or more.

The operations of the antenna 10, the receiving unit 11, and the transmission rate estimation unit 12 are the same as those of the first embodiment. The transmission rate R estimated by the transmission rate estimation unit 12 is input to the rate conversion units 13-1 to 13-3. The rate conversion units 13-1 to 13-3 initially convert the received signal into signals of transmission rates obtained by providing different offset amounts to the sampling frequency of the received signal, that is, the sampling rate Rs. For example, the rate conversion unit 13-1 changes the received signal to a signal of a sampling rate of Rs+r, the rate conversion unit 13-2 changes the received signal to a signal of a sampling rate of Rs, and the rate conversion unit 13-3 changes the received signal to a signal of a sampling rate of Rs−r. After that, when parameters are input by the parameter update unit 18, each of the rate conversion units 13-1 to 13-3 converts the received signal into a signal of a rate corresponding to the input parameter.

Each of the sample extraction units 14-1 to 14-3 extracts an N-sample signal from the signal after the sampling frequency conversion input from the corresponding one of the rate conversion units 13-1 to 13-3, and outputs the extracted signal to the identification unit 15. That is, each of the sample extraction units 14-1 to 14-3 extracts a signal having a predetermined signal length from the corresponding one of a plurality of signals converted to signals of a plurality of sampling frequencies. The signals converted to the different rates are input from the rate conversion units 13-1 to 13-3 to the identification unit 15. The identification unit 15 calculates identification results, that is, a probability distribution as in the first embodiment for each of the signals. The reliability calculator 16 calculates a specification with a high probability and reliability as in the first embodiment for each of the probability distributions. The reliability determination unit 17 determines whether or not the highest reliability out of the plurality of reliabilities is higher than or equal to a threshold value. When the reliability determination unit 17 determines that the highest reliability of the plurality of reliabilities is higher than or equal to the threshold value, the reliability determination unit 17 outputs the specification corresponding to the highest reliability as a final identification result.

When the highest reliability of the reliabilities is less than the threshold value, the reliability determination unit 17 inputs the reliabilities to the parameter update unit 18. The parameter update unit 18 compares the reliabilities with the previous corresponding reliabilities, updates the parameters to increase the reliabilities, and inputs the updated parameters to the corresponding rate conversion units 13-1 to 13-3. Thereafter, as in the first embodiment, the processing of the rate conversion units 13-1 to 13-3, the sample extraction units 14-1 to 14-3, the identification unit 15, the reliability calculator 16, and the reliability determination unit 17 is performed. When the highest reliability out of the plurality of reliabilities is higher than or equal to the threshold value, the reliability determination unit 17 outputs the specification corresponding to the highest reliability as a final identification result. When the highest reliability out of the plurality of reliabilities is less than the threshold value, the parameter update unit 18 updates the parameters, and thereafter, as in the first embodiment, the processing is repeated until the reliability determination unit 17 determines that the highest reliability out of the plurality of reliabilities is higher than or equal to the threshold value.

Thus, in the present embodiment, the rate conversion units 13-1 to 13-3 convert a received signal to signals of a plurality of sampling frequencies that are different from each other. The identification unit 15 calculates a probability corresponding to each of a plurality of candidates, for each of a plurality of signals converted to the signals of the plurality of sampling frequencies. Then, the reliability calculator 16 selects candidates corresponding to each of the signals of a plurality of rates, and calculates a reliability corresponding to each of the candidates. The reliability determination unit 17 makes a determination on whether to perform processing to output a selected candidate as an identification result or perform the sampling frequency conversion again, based on the reliabilities corresponding to the plurality of rates.

The rate conversion units 13-1 to 13-3 and the sample extraction units 14-1 to 14-3 are implemented by processing circuitry like the rate conversion unit 13 and the sample extraction unit 14 of the first embodiment.

As described above, in the present embodiment, sampling frequency conversion processing and sample extraction processing are parallelized. Consequently, the same effects as those of the first embodiment can be obtained, and the time from the input of a received signal to the output of an identification result can be shortened as compared with that in the first embodiment.

Third Embodiment

FIG. 9 is a diagram illustrating a configuration example of a signal specification identification apparatus according to a third embodiment. As illustrated in FIG. 9, a signal specification identification apparatus 1b of the present embodiment includes the antenna 10, the receiving unit 11, the transmission rate estimation unit 12, the rate conversion units 13-1 to 13-3, the sample extraction units 14-1 to 14-3, identification units 15-1 to 15-3, the reliability calculator 16, the reliability determination unit 17, and the parameter update unit 18. The configuration of each of the identification units 15-1 to 15-3 is the same as that of the identification unit 15 of the first embodiment. The same reference numerals as those in the second embodiment are assigned to components having the same functions as those of the second embodiment without duplicated explanations. Hereinafter, differences from the second embodiment will be mainly described.

In the third embodiment, as in the second embodiment, sampling frequency conversion processing and sample extraction processing are parallelized, and further, identification processing is parallelized. For example, when a received signal is a signal of a wide frequency band, the search range of the transmission rate of the received signal may also be wide. In this case, by dividing the search range of a sampling frequency into a plurality of ranges according to the transmission rate and performing identification processing on each divided range, a specification may be able to be identified with higher accuracy. For example, when candidates for the specification are ten types of modulation schemes, the modulation schemes are classified into modulation schemes with high transmission rates, modulation schemes with low transmission rates, and modulation schemes with medium transmission rates. Then, each of the rate conversion units 13-1 to 13-3 is assigned to one of the three ranges of the transmission rates, and parameters of the rate conversion units 13-1 to 13-3 are set such that sampling frequency conversions are performed according to the corresponding transmission rates.

Each of the sample extraction units 14-1 to 14-3 extracts an N-sample signal as in the second embodiment and inputs the extracted signal to the corresponding one of the identification units 15-1 to 15-3. Each of the identification units 15-1 to 15-3 performs identifications processing on the candidates of the corresponding range of the transmission rate. That is, each of the identification units 15-1 to 15-3 calculates a probability corresponding to each of a plurality of specification candidates, using the corresponding one of the plurality of signals converted to signals of the plurality of sampling frequencies. Each of the identification units 15-1 to 15-3 calculates a probability distribution for the reliability calculator 16. The reliability calculator 16 calculates a specification with a high probability and reliability for each of the probability distributions as in the second embodiment. The reliability determination unit 17 determines whether or not the highest reliability out of the plurality of reliabilities is higher than or equal to a threshold value as in the second embodiment. When the highest reliability out of the reliabilities is higher than or equal to the threshold value, the reliability determination unit 17 outputs the specification corresponding to the highest reliability as a final identification result.

When the highest reliability out of the plurality of reliabilities is less than the threshold value, the reliability determination unit 17 inputs the plurality of reliabilities to the parameter update unit 18. The parameter update unit 18 compares the reliabilities with the previous corresponding reliabilities, updates the parameters to increase the reliabilities, and inputs the updated parameters to the corresponding rate conversion units 13-1 to 13-3. At this time, in the present embodiment, the parameter update unit 18 updates the parameters so that the rate after the sampling frequency conversion of each of the rate conversion units 13-1 to 13-3 falls within a range suitable for the corresponding transmission rates. The operation of the present embodiment other than that described above is the same as that of the second embodiment.

The identification units 15-1 to 15-3 are implemented by processing circuitry like the identification unit 15 of the first embodiment.

In the above-described example, the three rate conversion units 13-1 to 13-3, the three sample extraction units 14-1 to 14-3, and the three identification units 15-1 to 15-3 are provided to perform processing in three parallels, but the number of parallels is not limited to three and may be two or four or more. That is, the identification units 15-1 to 15-3 are an example of a plurality of identification units.

As described above, in the present embodiment, sampling frequency conversion processing and sample extraction processing are parallelized. Consequently, the same effects as those of the second embodiment can be obtained, and even when a specification of a received signal of a wide frequency band are identified, identification for a proper range of transmission rates can be performed, and identification accuracy can be improved.

The configurations described in the above embodiments illustrate an example and can be combined with another known art. The embodiments can be combined with each other. The configurations can be partly omitted or changed without departing from the gist.

The signal specification identification apparatus according to the present disclosure has the effect of being able to reduce or prevent the degradation of the accuracy of signal specification identification.

What is claimed is:

1. A signal specification identification apparatus comprising:
    processing circuitry
    to estimate a transmission rate of a received signal;
    to perform sampling frequency conversion on the received signal;
    to calculate a probability corresponding to each of a plurality of candidates for a specification of the received signal, using a signal after the sampling frequency conversion;
    to select a candidate from among the plurality of candidates using the respective probabilities of the candidates calculated, and calculate reliability corresponding to a selected candidate that is the candidate selected;

to make a determination on whether to perform processing to output the selected candidate as an identification result or perform the sampling frequency conversion again, based on the reliability; and to change a parameter indicating a ratio of the sampling frequency conversion and set the changed parameter for the sampling frequency conversion it is determined that the sampling frequency conversion is to be performed again, wherein in initial sampling frequency conversion, the sampling frequency conversion is performed such that a sampling frequency after the sampling frequency conversion becomes twice or more the transmission rate estimated, and when the parameter is input, the sampling frequency conversion according to the parameter is performed, and processing of the parameter changing, the sampling frequency conversion, the calculating the probabilities, the reliability calculation, and the determination is repeated until it is determined that the processing to output the selected candidate as the identification result is to be performed.

2. The signal specification identification apparatus according to claim 1, wherein the processing circuitry extracts a signal of a predetermined signal length from the signal after the sampling frequency conversion, wherein the processing circuitry calculates the probability corresponding to each of the plurality of candidates, using the signal extracted.

3. The signal specification identification apparatus according to claim 1, wherein the processing circuitry converts the received signal to signals of a plurality of sampling frequencies different from each other, calculates the probability corresponding to each of the plurality of candidates for each of a plurality of converted signals of the plurality of sampling frequencies, selects the candidate corresponding to each of the signals of the plurality of sampling frequencies and calculates the reliability corresponding to the candidate, and makes the determination based on a plurality of the reliabilities corresponding to the plurality of sampling frequencies.

4. The signal specification identification apparatus according to claim 3, wherein the processing circuitry calculates the probability corresponding to each of the plurality of candidates, using a corresponding one of the plurality of signals converted to the plurality of sampling frequencies.

5. The signal specification identification apparatus according to claim 3, wherein the processing circuitry extracts signals having a predetermined signal length from the signals converted to the plurality of sampling frequencies, and calculate the probabilities corresponding to the plurality of candidates, using the signals extracted.

6. The signal specification identification apparatus according to claim 1, wherein the processing circuitry calculates a feature from the signal after the sampling frequency conversion, and calculates the probability corresponding to each of the plurality of candidates, based on distances between the feature calculated and predetermined features corresponding to the plurality of candidates.

7. The signal specification identification apparatus according to claim 1, wherein the processing circuitry calculates the probability corresponding to each of the plurality of candidates input, using a learned model learned according to learning data including the signal after the sampling frequency conversion and the probabilities corresponding to each of the plurality of candidates.

8. The signal specification identification apparatus according to claim 1, wherein the processing circuitry selects the candidate with the highest probability out of the respective probabilities of the candidates, as the selected candidate.

9. The signal specification identification apparatus according to claim 1, wherein the processing circuitry holds past reliability, and changes the parameter to increase the reliability according to a predetermined search algorithm for searching for a solution that maximizes the reliability, using the past reliability and the reliability calculated this time.

10. A control circuit for controlling a signal specification identification apparatus, the control circuit causing the signal specification identification apparatus to perform:

estimating a transmission rate of a received signal;

performing sampling frequency conversion on the received signal;

calculating a probability corresponding to each of a plurality of candidates for a specification of the received signal, using a signal after the sampling frequency conversion;

selecting a candidate from among the plurality of candidates using the respective probabilities of the candidates calculated, and calculating reliability corresponding to a selected candidate that is the candidate selected;

making a determination on whether to perform processing to output the selected candidate as an identification result or perform the sampling frequency conversion again, based on the reliability; and changing a parameter indicating a ratio of the sampling frequency conversion when it is determined in the determination that the sampling frequency conversion is to be performed again, wherein the control circuit controls the signal specification identification apparatus such that in the sampling frequency conversion, in initial sampling frequency conversion, the sampling frequency conversion is performed such that a sampling frequency after the sampling frequency conversion becomes twice or more the transmission rate estimated in the transmission rate estimation, and when the parameter is changed, the sampling frequency conversion is performed according to the changed parameter, and the control circuit causes the signal specification identification apparatus to repeat the changing the parameter, the sampling frequency conversion, the calculating the probability, the reliability calculation, and the making the determination until it is determined that the processing to output the selected candidate as the identification result is to be performed.

11. A non-transitory computer readable medium to store a program for controlling a signal specification identification apparatus, the program causing the signal specification identification apparatus to perform:

estimating a transmission rate of a received signal;

performing sampling frequency conversion on the received signal;

calculating a probability corresponding to each of a plurality of candidates for a specification of the received signal, using a signal after the sampling frequency conversion;

selecting a candidate from among the plurality of candidates using the respective probabilities of the candidates calculated, and calculating reliability corresponding to a selected candidate that is the candidate selected;

making a determination on whether to perform processing to output the selected candidate as an identification result or perform the sampling frequency conversion again, based on the reliability; and changing a parameter indicating a ratio of the sampling frequency conversion when it is determined in the determination that the sampling frequency conversion is to be performed again, wherein the program controls the signal specification identification apparatus such that in the sampling frequency conversion, in initial sampling frequency conversion, the sampling frequency conversion is performed such that a sampling frequency after the sampling frequency conversion becomes twice or more the transmission rate estimated in the transmission rate estimation, and when the parameter is changed, the sampling frequency conversion is performed according to the changed parameter, and the program causes the signal specification identification apparatus to repeat the changing the parameter, the sampling frequency conversion step, the calculating the probability, the reliability calculation, and the making the determination until it is determined that the processing to output the selected candidate as the identification result is to be performed.

\* \* \* \* \*